US009711996B2

(12) United States Patent
Han et al.

(10) Patent No.: US 9,711,996 B2
(45) Date of Patent: Jul. 18, 2017

(54) EMERGENCY SYSTEM WITH BROWN-OUT DETECTION

(71) Applicant: Hubbell Incorporated, Shelton, CT (US)

(72) Inventors: Lei Han, Greenville, SC (US); John Lane, Simpsonville, SC (US)

(73) Assignee: Hubbell Incorporated, Shelton, CT (US)

( * ) Notice: Subject to any disclaimer, the term of this patent is extended or adjusted under 35 U.S.C. 154(b) by 73 days.

(21) Appl. No.: 14/991,128

(22) Filed: Jan. 8, 2016

(65) Prior Publication Data

US 2016/0204652 A1    Jul. 14, 2016

Related U.S. Application Data

(60) Provisional application No. 62/101,526, filed on Jan. 9, 2015.

(51) Int. Cl.
*H05B 37/02* (2006.01)
*H02J 9/06* (2006.01)

(52) U.S. Cl.
CPC .............. *H02J 9/061* (2013.01); *H02J 9/062* (2013.01); *H05B 37/0209* (2013.01)

(58) Field of Classification Search
None
See application file for complete search history.

(56) References Cited

U.S. PATENT DOCUMENTS

| 5,315,533 A | 5/1994 | Stich et al. |
| 2009/0195161 A1* | 8/2009 | Lane .................. H02J 9/065 315/86 |
| 2011/0305051 A1 | 12/2011 | Yang et al. |
| 2013/0147376 A1* | 6/2013 | Trainor .............. H02J 9/065 315/200 R |
| 2014/0125133 A1 | 5/2014 | Han et al. |

OTHER PUBLICATIONS

PCT/US2016/012613 International Search Report and Written Opinion dated May 19, 2016.

* cited by examiner

*Primary Examiner* — Jany Richardson
(74) *Attorney, Agent, or Firm* — Michael Best & Friedrich, LLP

(57) ABSTRACT

An emergency system including an auxiliary power supply, a charging circuit, a brown-out circuit, and a controller unit. The auxiliary power supply connected to a device. The charging circuit having an input voltage, provided by a mains power supply, and an output, configured to provide power to the auxiliary power supply. The brown-out circuit operably connected to the charging circuit and configured to sample the input voltage. The control unit receiving the sampled input voltage and activating the device when a brown-out condition is detected, the detection based on the sampled input voltage.

20 Claims, 8 Drawing Sheets

EMERGENCY SYSTEM WITH BROWN-OUT DETECTION

CROSS-REFERENCE TO RELATED CASES

This application claims the benefit of U.S. Provisional Patent Application No. 62/101,526, filed on Jan. 9, 2015, the entire contents of which are incorporated herein by reference.

BACKGROUND

The present application relates to emergency lighting equipment.

SUMMARY

Emergency lighting equipment and units provide essential illumination coverage for individual buildings or building complexes in the event of failure of the mains power supply, for example, so evacuation can be performed safely. Emergency lighting units are typically used to light the path of egress such as corridors, walkways, stairways, and exits from the premises. In response to power outage or reduction, emergency lighting units automatically transfer to emergency mode, providing necessary illumination in assisting building evacuation.

Emergency lighting units detect the existence of an emergency condition by detecting a brown-out event. A brown-out event is a type of an emergency condition during which the mains voltage provided to a building is reduced. Brown-out events occur when the demand for electricity is fairly high so that the mains voltage is dropped from its nominal level due to heavy loads. The mains voltage level may be reduced to a point at which some of the normally-on lighting fixtures are not able to operate.

The design of the brown-out detection circuitry in legacy emergency lighting units typically involves line frequency transformers or capacitive divider circuits. Implementing brown-out circuitry in such a system is relatively simple, using multiple input voltage taps on the primary side of the transformer or the capacitive divider. One of the disadvantages of the method of using multiple input voltage taps for detecting brown-outs is the loading effect. In most cases the output of the line frequency transformer or the capacitive divider also needs to power the downstream battery charger circuitry presented as a variable load depending on the status of charge of the batteries.

High frequency switch-mode power conversion technology has witnessed some adoption in emergency lighting applications due to its cost and size advantages over the traditional line frequency transformers or capacitive divider circuits found in legacy emergency lighting products. Utilizing a switch-mode power conversion topology allows for wide input voltage range which typically covers from 102-305 VAC 50/60 Hz. This eliminates the multiple voltage taps that are needed with line frequency transformers or capacitive divider input circuits. Being able to handle universal input voltage has several advantages including avoiding wiring mistakes and overall size and cost reduction in the design.

Traditional brown-out detection methods, however, cannot be used in a switch-mode power conversion topology. The multiple voltage taps are not available because a switch-mode power conversion topology inherently is able to handle universal input voltage. Unlike the line frequency transformers or capacitive dividers, the secondary output voltage of a switch-mode power converter is typically regulated and is not proportional to the input voltage. Also, the galvanic isolation that is usually implemented in an offline switch-mode power conversion topology adds complexity in detecting mains voltage level. This is because mains voltage measurement should be taken at the primary side, while the control unit, typically in the form of a microcontroller unit (MCU), is located at the secondary side. The brown-out signal has to be transmitted through the isolation barrier to activate the emergency mode in responding to the mains voltage drop. Thus, known method of brown-out detection may lead to inaccurate detection of a brown-out event.

Therefore, in one embodiment, the application provides an emergency system including an auxiliary power supply, a charging circuit, a brown-out circuit, and a controller unit. The auxiliary power supply connected to a device. The charging circuit having an input voltage, provided by a mains power supply, and an output, configured to provide power to the auxiliary power supply. The brown-out circuit operably connected to the charging circuit and configured to sample the input voltage. The control unit receiving the sampled input voltage and activating the device when a brown-out condition is detected, the detection based on the sampled input voltage.

In another embodiment, the application provides an emergency system including a housing, a battery, a charging circuit, a brown-out circuit, and a control unit. The housing containing a lamp and a driver supplying power to the lamp. The battery selectively supplying power to the driver. The charging circuit having an input voltage from a mains power supply and an output to provide power to the battery. The brown-out circuit operably connected to the charging circuit to sample the input voltage. The control unit receiving the sampled input voltage and activating the lamp when a brown-out condition is detected, the detection based on the sampled input voltage.

In another embodiment the application provides a method of operating an emergency system. The method including receiving an AC input voltage from a charging circuit; selecting between a first brown-out threshold and a second brown-out threshold based on the input voltage; and initiating a brown-out condition if the input voltage is below the selected brown-out threshold.

Other aspects of the application will become apparent by consideration of the detailed description and accompanying drawings.

DETAILED DESCRIPTION

Before any embodiments of the application are explained in detail, it is to be understood that the application is not limited by the details of construction and the arrangement of components set forth in the following description or illustrated in the following drawings. The application is capable of other embodiments and of being practiced or of being carried out in various ways.

Figure 1:
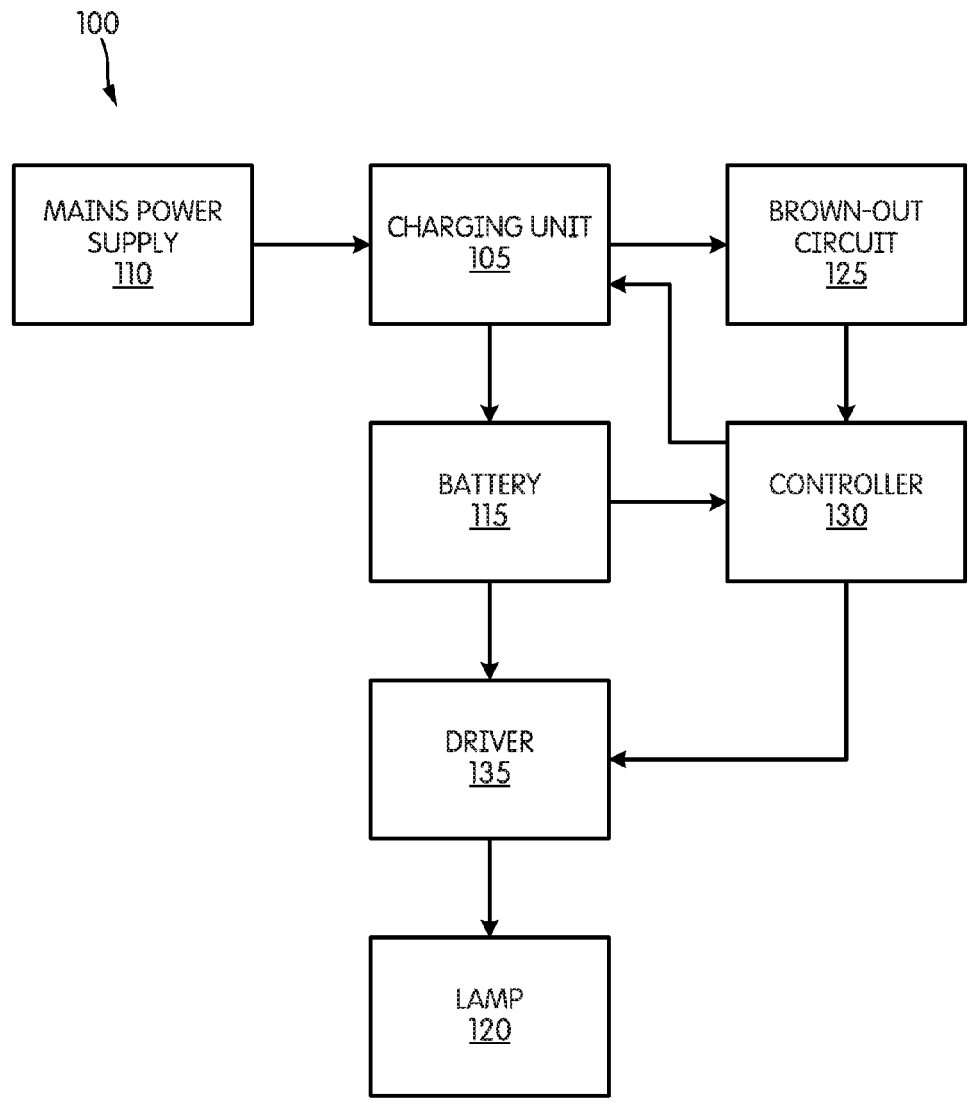
FIG. 1 illustrates a block diagram of an emergency lighting system, according to some embodiments of the application

FIG. 1 illustrates a block diagram of an emergency lighting system 100 according to some embodiments of the application. The emergency lighting system 100 includes a charging circuit, or charging unit, 105 electrically coupled to a mains power supply 110 and a battery, or auxiliary power supply, 115. The charging unit 105 is configured to receive power (e.g., a mains voltage of approximately 102 VAC to approximately 305 VAC) from the mains power supply 110 and charge the battery 115. When the mains power supply 110 is unavailable, the emergency lighting system 100 is configured to provide power to one or more lamps 120 using the battery 115.

The emergency lighting system 100 further includes a brown-out circuit 125, a controller, or microcontroller unit (MCU), 130, and a driver 135. The brown-out circuit 125 extracts voltage information of the mains voltage from the charging unit 105 and output a brown-out signal (e.g., a direct-current voltage) that is proportional to the mains voltage.

The controller 130 receives the brown-out signal from the brown-out circuit 125 and monitors the brown-out signal to detect a brown-out event. The controller 130 may include power components and processing logic to support known or conventional features. For example, the controller 130 may include a processing unit and a memory. The processing unit is a hardware device for executing software instructions. The processing unit may be a microprocessor or other similar device. The memory includes, for example, a program storage area and a data storage area. The program storage area and the data storage area can include combinations of different types of memory, such as read-only memory (ROM), random access memory (RAM) or other suitable magnetic, optical, physical, or other non-transitory computer readable medium. The processing unit is connected to the memory and executes software instructions that are capable of being stored in a random access memory (RAM) of the memory (e.g., during execution), a read-only memory (ROM) of the memory (e.g., on a generally permanent basis). The software may include, one or more applications, program data, filters, rules, one or more program modules, and other executable instructions.

The driver 135 is configured to provide power to, and operate, the lamp 120. The driver 135 receives power from the battery 115. The driver 135 further receives a control signal from the controller 130. The driver 135 outputs a power to the lamp 120 based on control signal from the controller 130. The lamp 120 may include one or more lights, such as but not limited to, one or more light-emitting diodes (LEDs).

Figure 2:
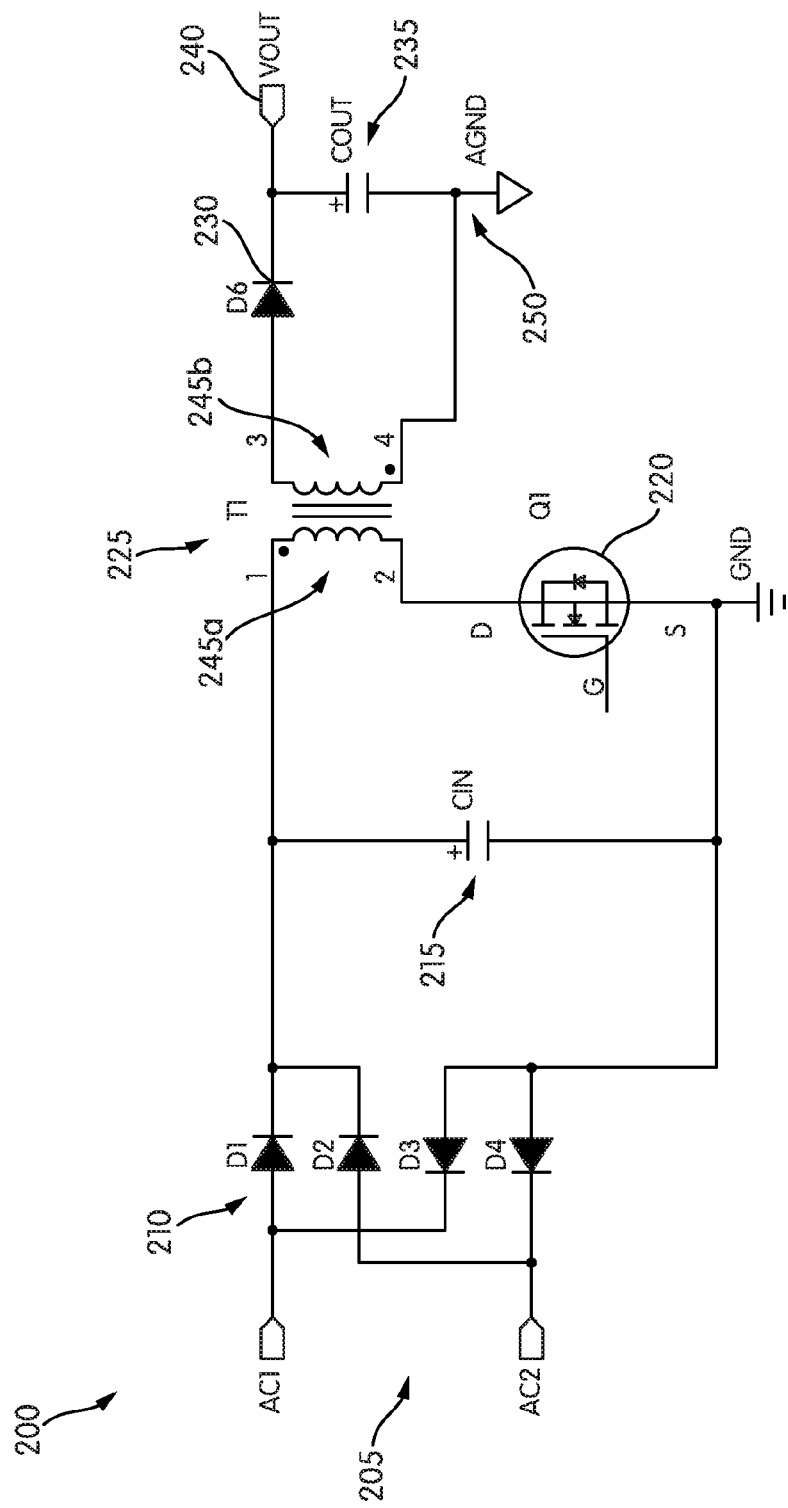
FIG. 2 illustrates a circuit diagram of a flyback circuit of a charging unit of the emergency lighting system of FIG. 1, according to one embodiment of the application

FIG. 2 illustrates a circuit diagram of a flyback circuit 200 of the charging unit 105 according to one embodiment of the application. The flyback circuit 200 includes an input 205, a rectifier 210, a filter capacitor 215, a switch 220, a flyback transformer 225, a diode 230, an output capacitor 235, and an output 240.

The input 205 receives the mains voltage from the mains power supply 110. The rectifier 210 rectifies the mains voltage. In some embodiments, the rectifier 210 includes one or more diodes (e.g., D1, D2, D3, D4, etc.). In other embodiments, the rectifier 210 is a half-bridge rectifier or a full-bridge rectifier. The filter capacitor 215 filters the rectified mains voltage.

The flyback transformer 225 includes a primary side 245a having a pin 1 and a pin 2, and a secondary side 245b having a pin 3 and a pin 4. The flyback transformer 225 is configured store energy, and then transmit the stored energy, while providing electrical isolation between the primary side 245a and the primary side 245b. The flyback transformer 225 is controlled by the switch 220. The switch 220 may be any type of electronic switch, including but not limited to, a semiconductor device, such as a transistor (e.g., a bipolar junction transistor [BJT], a field-effect transistor [FET], a junction gate field-effect transistor [JFET], a metal-oxide-semiconductor field-effect transistor [MOSFET], etc.). The diode 230 and output capacitor 235 are configured to rectify and/or filter voltage output from the secondary side 245b before the voltage is output from output 240.

In operation, during an ON period, the switch 220 is turned on and the transformer 225 (via the primary side 245a) receives the rectified-filtered mains voltage and stores the voltage in the air gap of the core of the transformer 225. Additionally, during the ON period, transformed voltage stored in the output capacitor 235 is output from output 240. During an OFF period, the switch 220 is turned off and the transformer 225 (via the secondary side 245b) outputs (i.e., releases) the transformed voltage to diode 230 and output capacitor 235. The transformed voltage is rectified by diode 230 and stored in the output capacitor 235.

During the ON period, the rectified-filtered mains voltage applied to the primary side 245a of the transformer 225 is simultaneously reflected at the secondary side 245b. In some embodiments, the voltage potential between pin 4 and 3, of the secondary side 245b, during the ON period, may be determined by Equation 1 below.

$$V_{Pin4} - V_{Pin3} = (V_{Pin1} - V_{Pin2}) * \frac{N_S}{N_P} = V_{Cin} * \frac{N_S}{N_P} \quad \text{[Equation 1]}$$

Where $V_{Pin4}$ is the voltage at pin 4; $V_{Pin3}$ is the voltage at pin 3; $V_{Pin2}$ is the voltage at pin 2; $V_{Pin1}$ is the voltage at pin 1; $N_s$ is the number of turns on the secondary side 245b $N_P$ is the number of turns on the primary side 245a; and $V_{Cin}$ is the capacitor voltage at filter capacitor 215.

As a result of pin 4, of the secondary side 245b, being electrically connected to a secondary ground 250, Equation 1 can be rewritten into Equation 2 below.

$$V_{Pin3} = -V_{Cin} * \frac{N_S}{N_P} \quad \text{[Equation 2]}$$

During the OFF period, the voltage at pin 3 $V_{Pin3}$ may be determined by Equation 3 below.

$$V_{Pin3} = V_{out} - V_{D6} \quad \text{[Equation 3]}$$

Where $V_{out}$ is equal to the voltage at the output 240 while $V_{D6}$ is equal to the voltage of diode 230. In some embodiments, the voltage at pin 3 $V_{Pin3}$ only carries information concerning the input mains voltage during the ON period.

Figure 3:
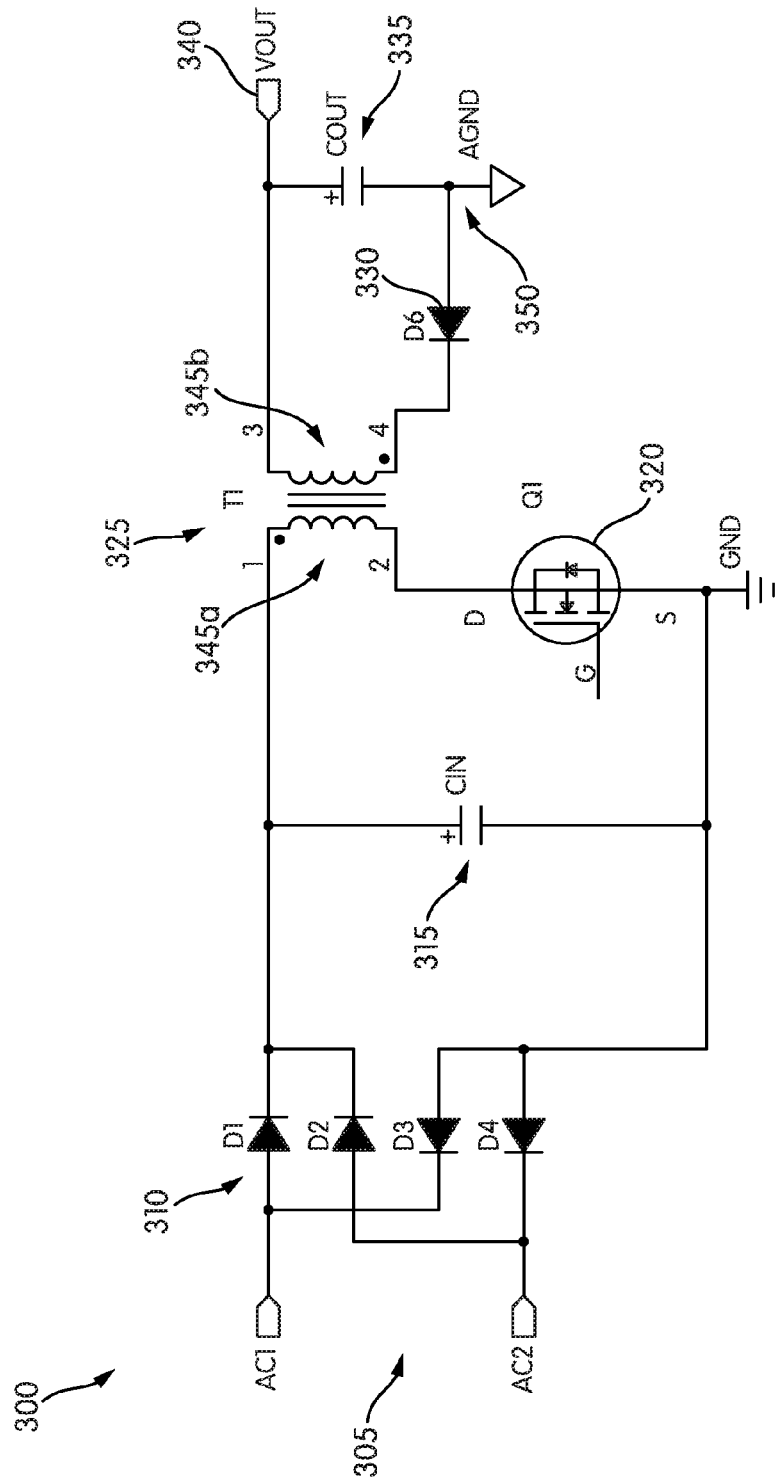
FIG. 3 illustrates a circuit diagram of a flyback circuit of a charging unit of the emergency lighting system of FIG. 1, according to another embodiment of the application.

FIG. 3 illustrates a circuit diagram of a flyback circuit 300 according to another embodiment of the application. Such an embodiment is substantially similar to flyback circuit 200, except for the placement of diode 330. In the illustrated embodiment of flyback circuit 300, diode 330 is electrically connected between pin 4 of the secondary side 345*a* and secondary ground 350. In such an embodiment, the voltage over the secondary side 345*a* (e.g., $V_{Pin4} - V_{Pin3}$) is positive during the ON period. Thus, the voltage of pin over the secondary side 345*a* may be determined by Equation 4 below.

$$V_{Pin4} - V_{Pin3} = V_{out} + V_{Cin} * \frac{N_S}{N_P} \quad \text{[Equation 4]}$$

Figure 4A:
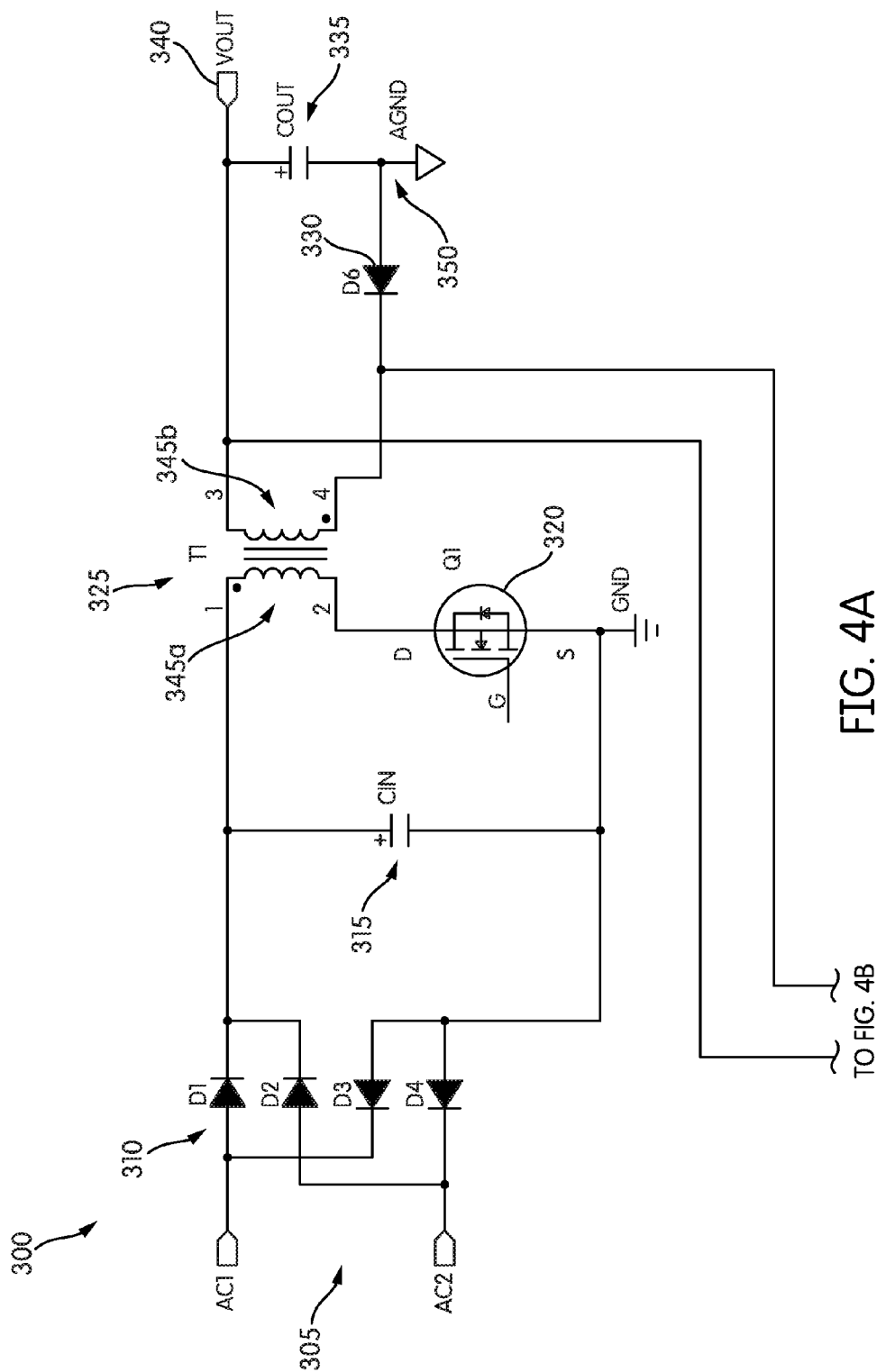
FIG. 4A illustrates a circuit diagram of a flyback circuit electrically connected to a brown-out detection circuit of the emergency lighting system of FIG. 1, according to some embodiments of the application
Figure 4B:
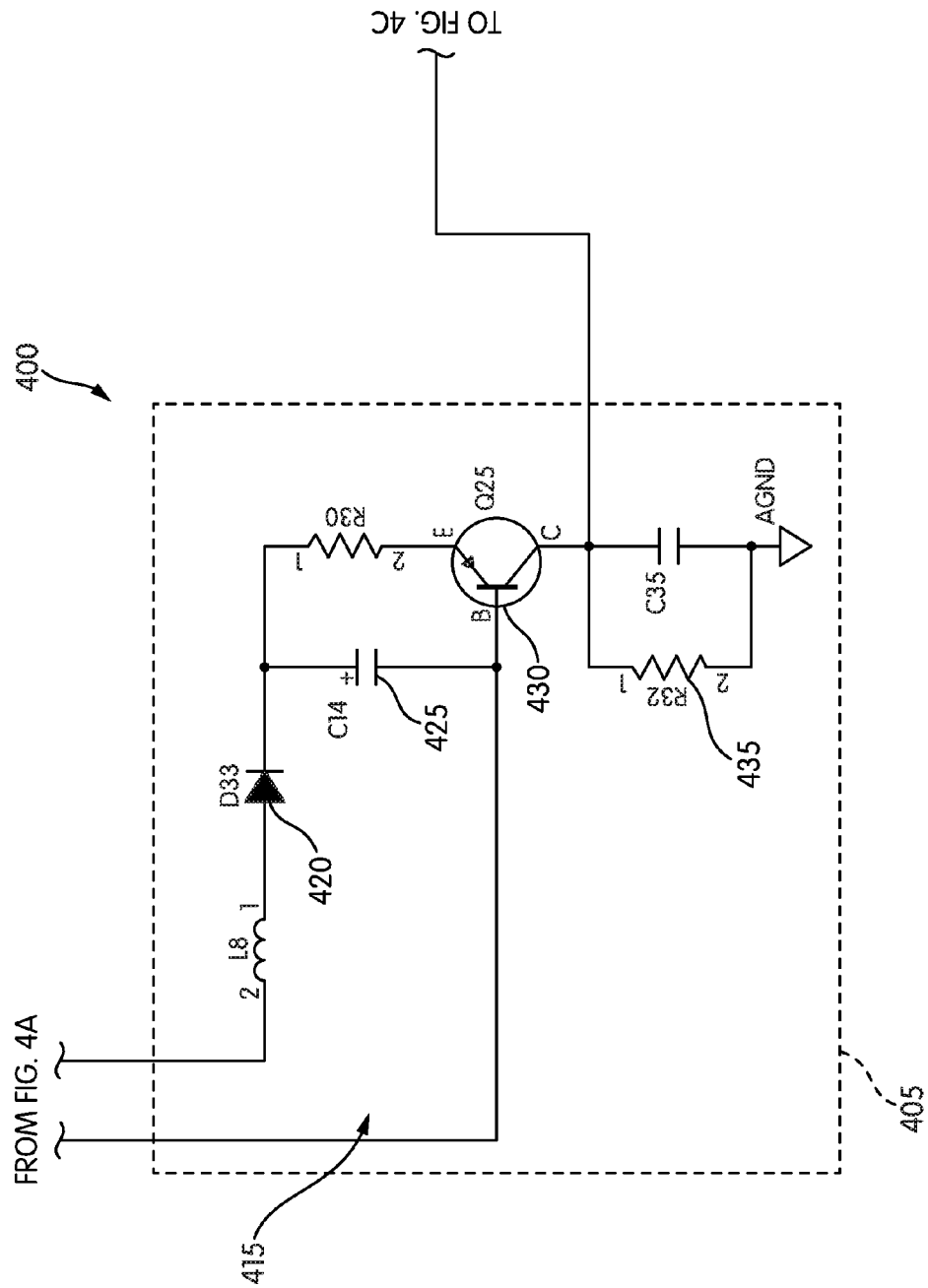
FIG. 4B illustrates a circuit diagram of a level-shifter circuit of a brown-out detection circuit of the emergency lighting system of FIG. 1, according to some embodiments of the application
Figure 4C:
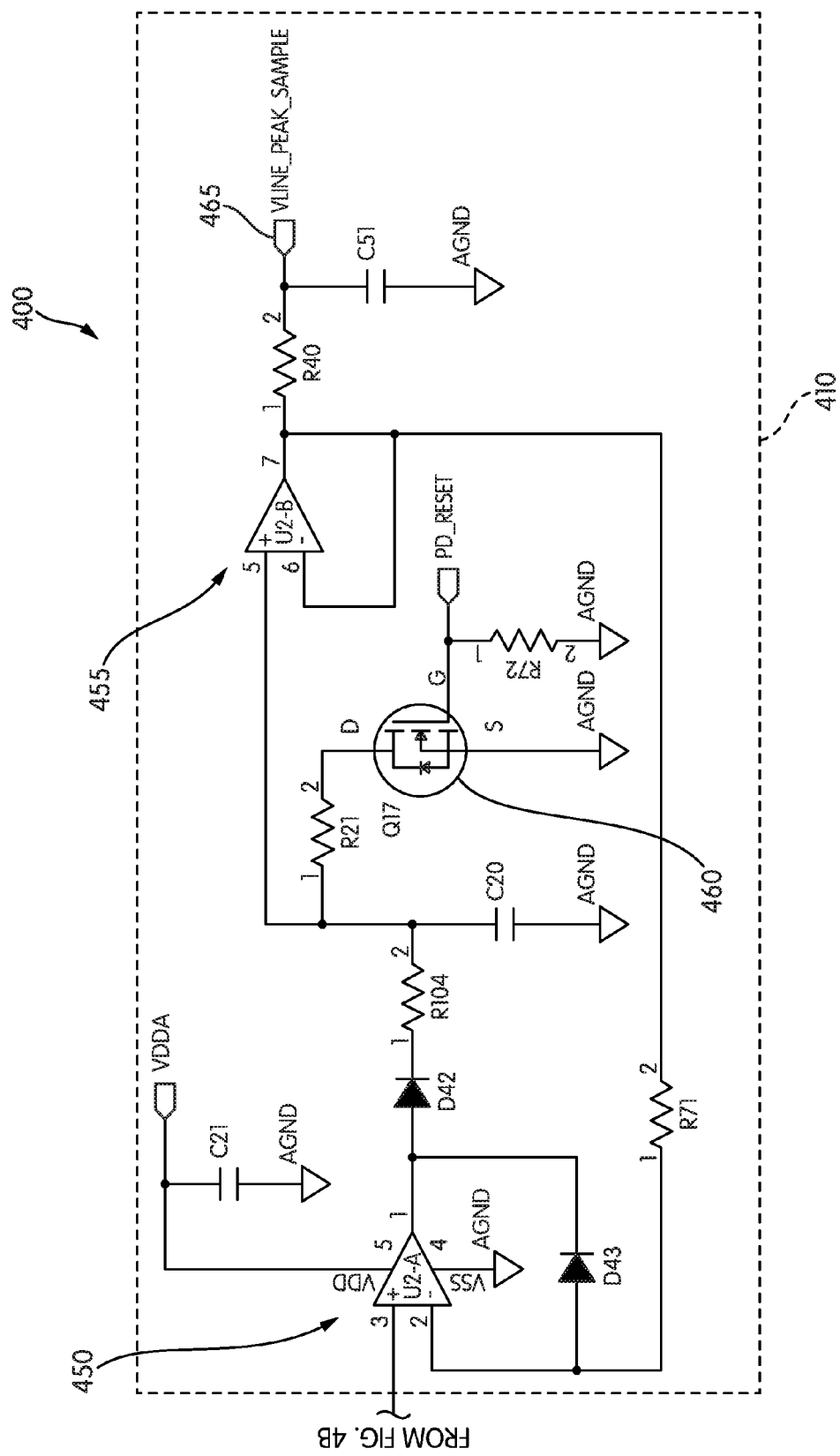
FIG. 4C illustrates a circuit diagram of a peak-detector circuit of a brown-out detection circuit of the emergency lighting system of FIG. 1, according to some embodiments of the application.

FIGS. 4A-4C illustrate a circuit diagram of the brown-out detection circuit 400 according to some embodiments of the application. Although illustrated as being electrically coupled to flyback circuit 300, in other embodiments, the brown-out detection circuit 400 may be electrically coupled to flyback circuit 200.

The brown-out detection circuit 400 includes a level-shifter circuit 405 and a peak-detector circuit 410. The level-shifter circuit 405 includes an input 415, a rectifier diode 420, a filter capacitor 425, a switch 430, and resistor 435. As illustrated, the level-shifter circuit 405 may include additional components, such as but not limited to, resistors, inductors, and capacitors, which may be used for, among other things, filtering purposes.

The level-shifter circuit 405 receives the secondary voltage ($V_{Pin4} - V_{Pin3}$) of the secondary side 245*a* at input 415. The secondary voltage is rectified and filtered by rectifier 420 and filter capacitor 425. The switch 430 is controlled by voltage $V_{Pin3}$ of pin 3. Although illustrated as a BJT, switch 430 may be any type of electronic switch, including but not limited to, a semiconductor device, such as a transistor (e.g., a FET, a JFET, a MOSFET, etc.). The level-shifter circuit 405 is configured to convert the secondary voltage ($V_{Pin4} - V_{Pin3}$) to a ground-referenced voltage rescaled to adapt to ADC interface requirement. The converted ground-referenced voltage is the voltage ($V_{R32}$) across resistor 435. The converted ground-referenced voltage $V_{R32}$ may be determined by using Equation 5 below.

$$V_{R32} = \left(V_{Cin} * \frac{N_S}{N_P} - V_{D33} - V_{be}\right) * \frac{R_{32}}{R_{30}} * \frac{\beta}{1+\beta} \quad \text{[Equation 5]}$$

Where $V_{D33}$ is the voltage drop across rectifier diode 420, $V_{be}$ is the voltage between the base of switch 430 and the emitter of switch 430, and $\beta$ is the current gain of switch 430.

In an exemplary embodiment, $V_{R32}$ is proportion to $V_{Cin}$ of filter capacitor 215. However, $V_{Cin}$ may fluctuate depending on the load demands and the capacitance of filter capacitor 215. For conventional offline flyback converters, $V_{Cin}$ is charged to the peak of input line voltage when there is no load demand. Additionally, for conventional offline flyback converters, $V_{Cin}$ is discharged every half-line cycle after the peak of the input line voltage, as the load demand increases. For high power factor single stage offline flyback converters, $V_{Cin}$ is charged to the peak of input line voltage when there is no load demand and $V_{Cin}$ follows the instantaneous rectified input voltage waveform when it is loaded. Thus, the peak of $V_{Cin}$ may be used to accurately represent the input voltage level, rather than using the average level.

The peak-detector circuit 410 is configured to sample and hold the peak of the instantaneous voltage $V_{R32}$ across resistor 435, which is proportional to $V_{Cin}$. The peak-detector circuit 410 minimizes the loading effect on $V_{Cin}$. The peak-detector circuit 410 includes a first operational amplifier 450, a second operational amplifier 455, a switch 460, and a peak sample output 465. As illustrated, the peak-detector circuit 410 may include additional components, such as but not limited to, resistors, inductors, and capacitors, which may be used for, among other things, filtering purposes.

The first operational amplifier 450 receives the instantaneous voltage $V_{R32}$ across resistor 435. The first operational amplifier 450, along with the second operational amplifier 455, hold the peak of the instantaneous voltage $V_{R32}$ and output the held voltage $V_{R32}$ from the peak sample output 465. The held voltage $V_{R32}$ output from peak sample output 465 may then be received by controller 130. Switch 460 is used to reset the peak-detector circuit 410. In some embodiment the reset of the peak-detector circuit 410 is synchronized to a sampling schedule to allow for real-time tracking of the mains voltage level.

Figure 5:
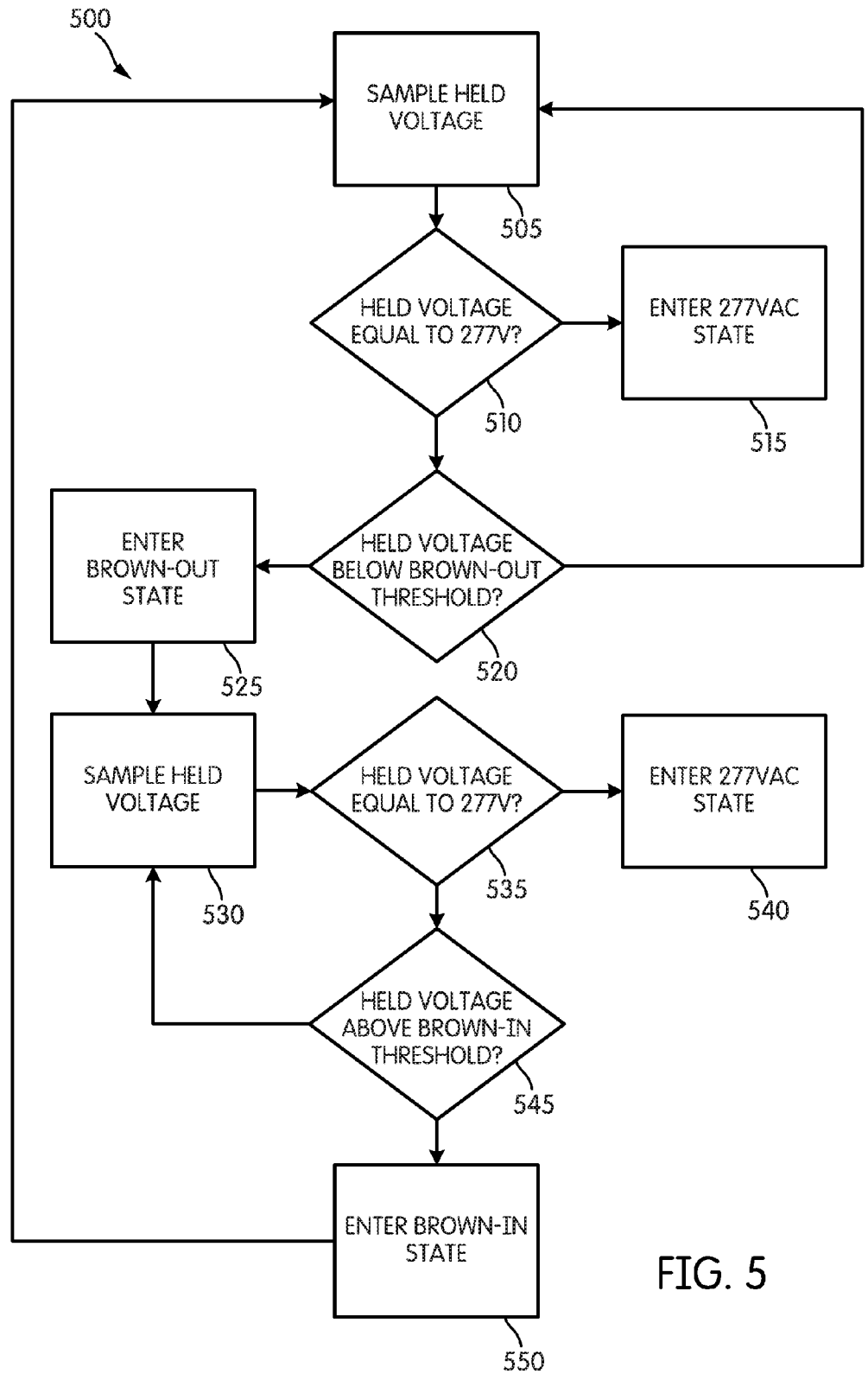
FIG. 5 illustrates a operation of the emergency lighting system of FIG. 1, for detecting a brown-out condition, according to some embodiments of the application.

FIG. 5 is a flow chart illustrating an exemplary operation, or algorithm, 500 for detecting a brown-out condition. The operation 500 may be performed by controller 130. The controller 130 samples the held voltage $V_{R32}$ (i.e., sampled input voltage), which is periodically output from peak sample output 465 (Step 505). In some embodiments the held voltage $V_{R32}$ is sampled according to a predetermined time period (e.g., approximately every 1 ms). The controller 130 determines if the held voltage $V_{R32}$ is equal to approximately 277V (Step 510). If the held voltage $V_{R32}$ is equal to approximately 277V, the system 100 enters the 277 VAC state (Step 515). If the held voltage $V_{R32}$ is not equal to approximately 277V, the system 100 operates in the 120 VAC state and operation 500 continues onto Step 520. In the 120 VAC state, the controller 130 determines if the sampled held voltage $V_{R32}$ is lower than a predetermined brown-out threshold, or level, for a predetermined brown-out glitch time period (Step 520). In some embodiments, the predetermined brown-out threshold is approximately 77% of the mains line voltage (e.g., approximately 92V for a mains line voltage of 120V). Additionally, in some embodiments, the brown-out glitch time period is approximately two-seconds.

If it is determined that the held voltage $V_{R32}$ is lower than the predetermined brown-out threshold, then a brown-out event is confirmed and the system 100 enters a brown-out state in which lamp 120 is powered by battery 115 (Step 525). During the brown-out state, the controller 130 once again samples the held voltage $V_{R32}$ (Step 530). The controller 130 once again determines if the held voltage $V_{R32}$ is equal to approximately 277V (Step 535). If the held voltage $V_{R32}$ is equal to approximately 277V, the system 100 enters the 277 VAC state (Step 540). If the held voltage $V_{R32}$ is not equal to approximately 277V, the controller 130 determines if the held voltage $V_{R32}$ is above a predetermined brown-in threshold for a predetermined brown-in glitch time period (Step 545). In some embodiments, the predetermined brown-in threshold is approximately 83% of the mains line voltage (e.g., approximately 99V for a mains line voltage of 120V). Additionally, in some embodiments, the brown-in glitch time period is approximately one-second.

If the held voltage $V_{R32}$ is above the predetermined brown-in threshold for the predetermined brown-in glitch time period, the system 100 enters the brown-in state in which the system 100 operates normally (e.g., lamp 120 powered off) (Step 550) and proceeds back to Step 505. If the held voltage $V_{R32}$ is not above the predetermined brown-in threshold for the predetermined brown-in glitch time period, operation 500 proceeds back to Step 530.

Figure 6:
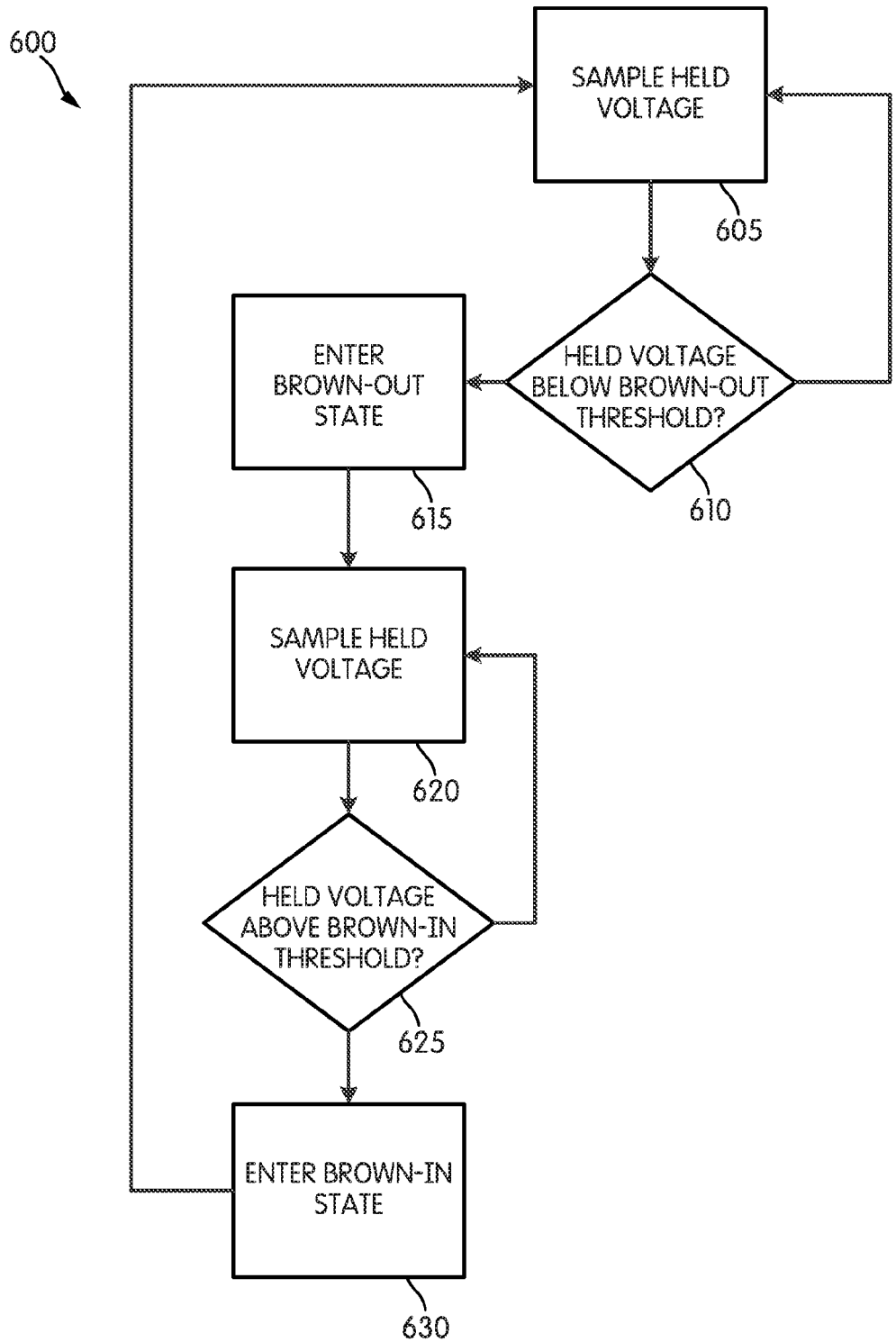
FIG. 6 illustrates a operation of the emergency lighting system of FIG. 1, for detecting a second brown-out condition, according to some embodiments of the application.

FIG. 6 is a flow chart illustrating an exemplary operation, or algorithm, 600 for detecting a brown-out event when the system 100 is in the 277 VAC state. The controller 130 samples the held voltage $V_{R32}$ (i.e., sampled input voltage), which is periodically output from peak sample output 465 (Step 605). In some embodiments the held voltage $V_{R32}$ is sampled according to a predetermined time period (e.g., approximately every 1 ms). The controller 130 determines if the sampled held voltage $V_{R32}$ is lower than a predetermined second brown-out threshold for a predetermined brown-out glitch time period (Step 610). In some embodiments, the predetermined second brown-out threshold is approximately 77% of the mains line voltage (e.g., approximately 213V for a mains line voltage of 277V). Additionally, in some embodiments, the brown-out glitch time period is approximately two-seconds.

If it is determined that the held voltage $V_{R32}$ is lower than the predetermined second brown-out threshold, then a brown-out event is confirmed and the system 100 enters a brown-out state in which lamp 120 is powered by battery 115 (Step 615). During the brown-out state, the controller 130 once again samples the held voltage $V_{R32}$ (Step 620). The controller 130 determines if the held voltage $V_{R32}$ is above a second predetermined brown-in threshold for a predetermined brown-in glitch time period (Step 625). In some embodiments, the predetermined second brown-in threshold is approximately 83% of the mains line voltage (e.g., approximately 230V for a mains line voltage of 277V). Additionally, in some embodiments, the brown-in glitch time period is approximately one-second.

If the held voltage $V_{R32}$ is above the predetermined second brown-in threshold for the predetermined brown-in glitch time period, the system 100 enters the brown-in state in which the system 100 operates normally (e.g., lamp 120 powered off) (Step 630) and proceeds back to Step 605. If the held voltage $V_{R32}$ is not above the predetermined second brown-in threshold for the predetermined brown-in glitch time period, operation 500 proceeds back to Step 620.

In the above embodiment, illustrated in FIGS. 5 and 6, when the system 100 is in the 277 VAC state, the system 100 will not shift back to the 120 VAC state unless an event occurs. In some embodiments, the event may be a reset event or a power-on event. Such an embodiment eliminates the need for constantly recalibrating the input voltage for possible different nominal voltage conditions.

The above described embodiments of the system 100 and methods 500, 600 may also be used in other applications, for example but not limited to, inverters and battery packs where flyback topology based offline power converters are used.

Thus, the invention provides, among other things, a system and method for detecting a brown-out condition. Various features and advantages of the invention are set forth in the following claims.

What is claimed is:

1. An emergency system comprising:
   an auxiliary power supply connected to a device;
   a charging circuit including a primary side receiving an input voltage provided by a mains power supply, the charging circuit further including a secondary side having an output configured to provide power to the auxiliary power supply;
   a brown-out circuit operably connected to the secondary side of the charging circuit and configured to sample the input voltage; and
   a control unit receiving the sampled input voltage and activating the device when a brown-out condition is detected, the detection based on the sampled input voltage.

2. The emergency system of claim 1, wherein the charging circuit further includes a flyback transformer isolating the primary side and the secondary side from each other.

3. The emergency system of claim 1, wherein the brown-out circuit scales the input voltage to a proportional DC voltage.

4. The emergency system of claim 1, wherein the brown-out circuit includes a level-shifter circuit and a peak-detector circuit.

5. The emergency system of claim 4, wherein the peak-detector circuit utilizes a dual operational amplifier connected to the output of the level-shifter circuit.

6. The emergency system of claim 1, wherein the control unit establishes a first brown-out level if the input voltage is below a first value and a establishes a brown-out level if the input voltage is above a second value.

7. The emergency system of claim 6, wherein the first brown-out level is associated with a 120V supply and the second brown-out level is associated with a 277V supply.

8. The emergency system of claim 1, wherein the auxiliary power supply includes a battery and the device includes a lamp.

9. An emergency system comprising:
   a housing containing a lamp and a driver supplying power to the lamp;
   a battery selectively supplying power to the driver;
   a charging circuit including a primary side receiving an input voltage from a mains power supply, the charging circuit further including a secondary side having an output to provide power to the battery;
   a brown-out circuit operably connected to the charging circuit to sample the input voltage; and
   a control unit receiving the sampled input voltage and activating the lamp when a brown-out condition is detected, the detection based on the sampled input voltage.

10. The emergency system of claim 9, wherein the charging circuit includes a flyback transformer isolating the primary side and the secondary side from each other.

11. The emergency system of claim 9, further comprising a brown-out threshold and a brown-in threshold.

12. The emergency system of claim 11, wherein the control unit activates the lamp when the input voltage is at or below the brown-out threshold and deactivates the lamp when the input voltage is at or above the brown-in threshold.

13. The emergency system of claim 11, further comprising a brown-out state and a normal state, and wherein the system switches from a normal state to a brown-out state when the input voltage is below the brown-out threshold and the system switches from the brown-out state to the normal state when the input voltage is at or above the brown-in threshold.

14. A method of operating an emergency system comprising:

receiving an AC input voltage from a charging circuit, the charging circuit including a primary side receiving the AC input voltage and a secondary side having an output configured to provide power to an auxiliary power supply;

selecting between a first brown-out threshold and a second brown-out threshold based on the input voltage; and initiating a brown-out condition if the input voltage is below the selected brown-out threshold.

15. The method of claim 14, further comprising:

associating a first brown-in threshold with the first brown-out threshold; and associating a second brown-in threshold with the second brown-out threshold.

16. The method of claim 15, wherein the second brown-out threshold is selected if the voltage is higher than the second brown-in threshold.

17. The method of claim 16, wherein the second brown-out threshold is maintained until a reset event occurs.

18. The method of claim 15, wherein the first brown-out threshold is approximately 77% of 120V and the first brown-in threshold is approximately 83% of 120V, and the second brown-out threshold is approximately 77% of 277V and the second brown-in threshold is approximately 83% of 120V.

19. The method of claim 14, wherein the first brown-out threshold is associated with 120 V and the second brown-out threshold is associated with 277 V.

20. The method of claim 14, wherein the charging circuit further includes a flyback transformer isolating the primary side and the secondary side from each other.

* * * * *